United States Patent
Amaral et al.

(10) Patent No.: US 9,200,745 B2
(45) Date of Patent: Dec. 1, 2015

(54) LEVELING FEET FOR HOUSEHOLD APPLIANCES

(75) Inventors: Gustavo Gnoatto Amaral, Curitiba (BR); Adriano Davin, Curitiba (BR); Rodrigo Marge Pagnozzi, Curitiba (BR)

(73) Assignee: ELECTROLUX DO BRASIL S.A., Curitiba (BR)

( * ) Notice: Subject to any disclaimer, the term of this patent is extended or adjusted under 35 U.S.C. 154(b) by 0 days.

(21) Appl. No.: 13/376,475

(22) PCT Filed: Jun. 10, 2010

(86) PCT No.: PCT/BR2010/000195
§ 371 (c)(1),
(2), (4) Date: Feb. 22, 2012

(87) PCT Pub. No.: WO2010/142010
PCT Pub. Date: Dec. 16, 2010

(65) Prior Publication Data
US 2012/0138755 A1    Jun. 7, 2012

(30) Foreign Application Priority Data
Jun. 10, 2009 (BR) .................................. 8901408 U

(51) Int. Cl.
| F16M 11/24 | (2006.01) |
| F16M 7/00 | (2006.01) |
| F16M 11/42 | (2006.01) |
| D06F 39/12 | (2006.01) |

(52) U.S. Cl.
CPC ............... *F16M 7/00* (2013.01); *D06F 39/125* (2013.01); *F16M 11/24* (2013.01); *F16M 11/42* (2013.01)

(58) Field of Classification Search
CPC .. F25D 2323/0011; F16M 7/00; F16M 11/42; F16M 11/24; D06F 39/125; B60B 33/06
USPC ........ 248/188.4, 188.1, 188.2, 188.8, 346.01, 248/346.05, 346.11, 646, 649, 650, 656, 248/129; 16/18 R, 19, 29, 45
See application file for complete search history.

(56) References Cited

U.S. PATENT DOCUMENTS

| 901,636 | A |  | 10/1908 | Mcintire |
| 3,455,526 | A | * | 7/1969 | Orii ............................... 248/615 |
| 4,789,121 | A | * | 12/1988 | Gidseg et al. .............. 248/188.2 |
| 5,971,408 | A |  | 10/1999 | Mandel et al. |
| 6,520,461 | B1 |  | 2/2003 | Graham |

FOREIGN PATENT DOCUMENTS

| CA | 2467568 | 11/2004 |
| DE | 202004017329 | 4/2006 |
| WO | 0045671 | 8/2000 |

OTHER PUBLICATIONS

International Search Report for PCT/BR2010/000195, dated Oct. 25, 2010, 3 pages.

* cited by examiner

*Primary Examiner* — Todd M Epps
(74) *Attorney, Agent, or Firm* — Pearne & Gordon LLP

(57) ABSTRACT

Leveling feet have embedded castors (3) that allow the leveling of a household appliance with a plastic thread. The castors are positioned relative to the floor to allow for movement of the household appliance upon the castors. The leveling feet have a base, that is preferably metallic, and that is connected to an internal ring (6), which contains threads on an external surface thereof. An external ring is coupled to the internal ring and has internal threads for mating with the external threads of the internal ring. The external ring moves vertically on the threads of the internal ring to change the height of the appliance.

7 Claims, 4 Drawing Sheets

LEVELING FEET FOR HOUSEHOLD APPLIANCES

FIELD OF THE INVENTION

This invention relates to a leveling device that is applied to the bottom of household appliances, such as fridges, freezers, and similar devices.

BACKGROUND OF THE APPLICATION

Some types of equipment utilize devices to horizontally level the equipment in respect to the surface, in view of the small imperfections or variations on a surface supporting it. The act to level is intended to generate a horizontal reference plane to adjust the variations between the equipment plane and the surface supporting it.

Usually, leveling devices are placed on the lower surface of equipment and fastened to the structure or also fastened to the additional structures interacting with the household appliance. Leveling devices provide a variation on the height of the fastening points in respect to the surface supporting it. This enables compensating for eventual differences that result from the irregularities or variations on the surface level.

Therefore, one unavoidable leveling device characteristic is the possibility of adjusting and regulating the height it provides to the equipment in respect to the surface, which could have different and variable irregularities.

Specifically, regarding the household appliances, the leveling devices refers to the very support feet which provide height adjustment and which enable the desired leveling of the device by a user.

Frequently, such feet are used together with castors easily move the household appliance. The castors comprise wheels or hinged cylinders that enable the free movement of the device on a relatively flat surface.

It is observed the state-of-arts in the household appliances that in some cases, leveling is accomplished by adjusting the product height in respect to its castors, which are not removed from the surface contact. Therefore, it locks are needed to prevent undesired movement of the household appliance on the castors. It is a challenge to provide a leveling device associated with the castors the chance of moving and locking the household appliance according to a user's needs in a practical and safe way using a compact device.

ANALYSIS OF THE STATE OF ART

CA 2467568 reveals an adjustable platform set to raise the device and includes the platform with several vertical foot parts apart. Each part of the foot has the first assembly opening to fasten the device to the platform and the second assembly opening to fasten the adjustable castor to the foot. The consumer could adjust the platform to a desired height by changing the castors height.

Model MU706532-3 provides the placement of an adjustment device on the side structural plates of the equipment. Castors act as positioning elements that cooperate with sliding grooves on the plates. Holes are used to fasten the screws to the structural plates.

U.S. Pat. No. 5,971,408 has exposed wheels that are adjustable vertically to support the cabinet in a movable way on the support surface. The adjustment mechanism includes the body, the support, wheel, adjustment rod, adjustment screw and several lengthened parts of the set. The wheel is defined by a pair of separate rollers, which are interconnected by a portion that is reduced diametrically. The arrangement represents a vertically adjustable set that is very compact. The mechanism can be previously assembled and connected to the fridge cabinet.

Document DE 202004017329 describes a height adjuster foot applied to a household appliance, particularly a fridge. The height adjuster foot comprises a threaded axis with a low plate and an endless wheel. The wheel is fastened to a gear along the axis.

U.S. Pat. No. 597,135 describes a height adjustment mechanism for use with a household appliance, such as a fridge or a dishwasher machine. The device includes two parts and is adjusted to replace at least one front foot of the device. The first part of the device is a manual wheel with an enlarged diameter that is rotated by a user. The manual wheel is fastened by a captive nut in the rotation device for increasing or reducing the device height. The second piece is a disk that is fastened in the manual wheel but contacting the surface.

This invention describes leveling feet with embedded castors that allow the household appliance to move and make it easier to handle so that undesirable disassembly of the devices parts and components is avoided.

This allows a leveling by the plastic thread, by removing the castor contacting the surface in order to compensate for possible irregularity in the surface and to fasten the product, thus inhibiting unexpected movements and ensuring the equipment stability.

Although the foot is totally unthreaded in an attempt to level the equipment, the device is not loosened in view of the set embedded lock system.

The invention also has a metallic base for supporting and fastening to the household appliances, which is optional. The set is directly fastened to the household appliance.

The arrangements described above provide several advantages such as providing stability to the household appliance, in view of the possible lock of the displacement provided by the leveling foot; utilizing a lower quantity of parts; the easy handling of the movement of the household appliance; easy adjustment of the leveling foot height; the guarantee of invention set integrity during the level adjustment.

DETAILED DESCRIPTION OF THE SOLUTION

Figure 1:
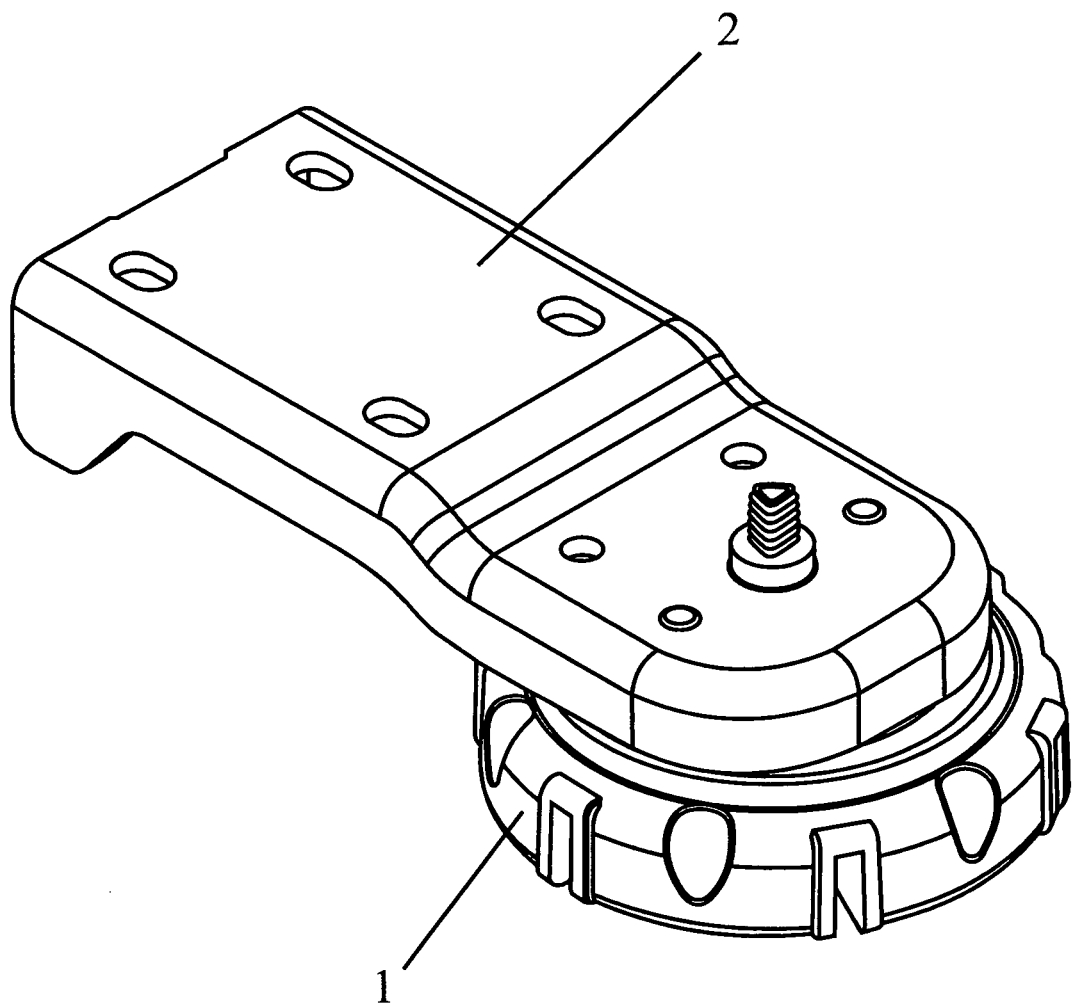
FIG. 1 illustrates a perspective view of the device set evidencing the perspective view of the external ring (1) and the base (2) supporting the household appliance.
Figure 2:
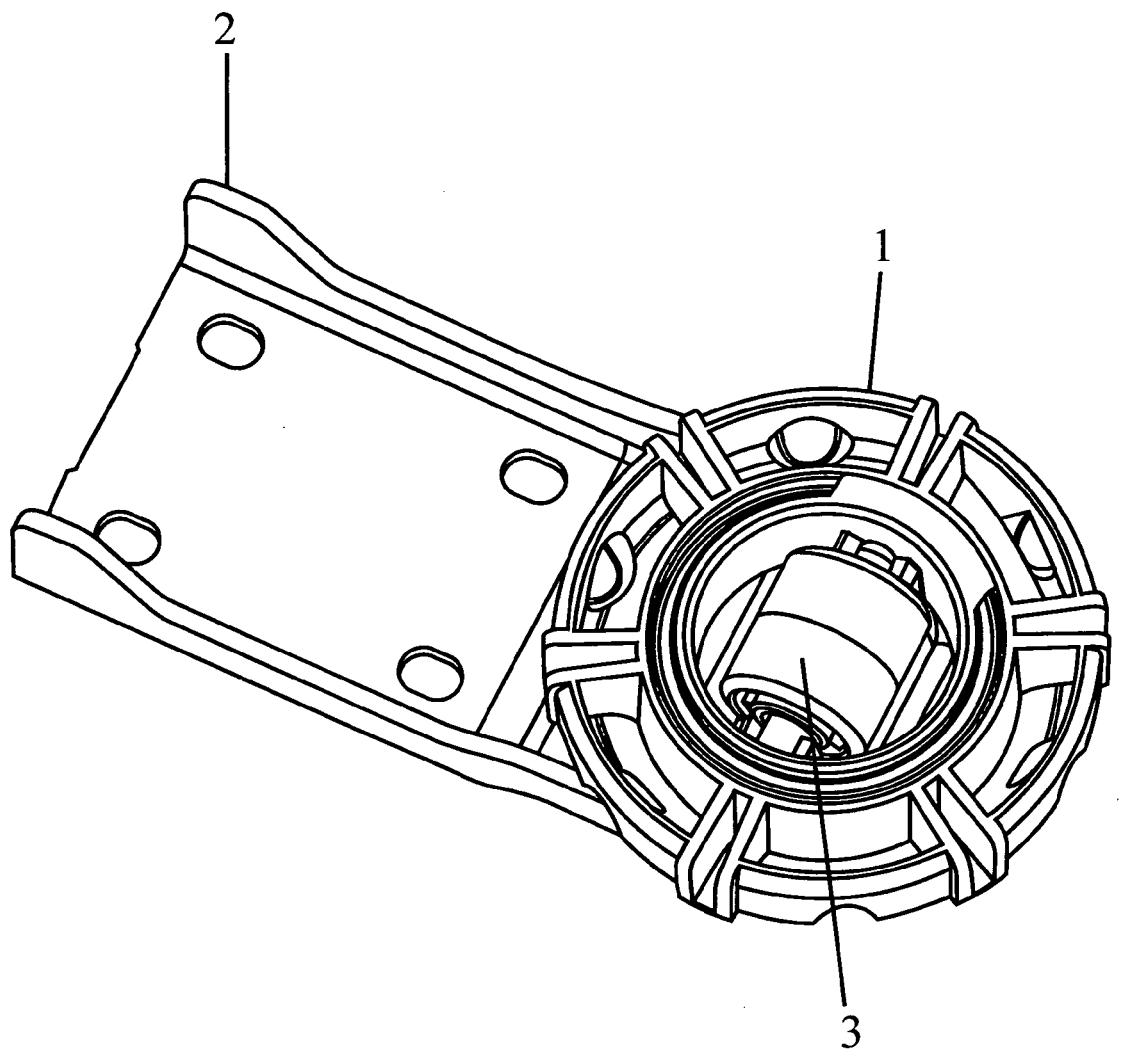
FIG. 2 illustrates a perspective view of the lower part of the set evidencing the external ring (1), the base (2) and the castor (3).
Figure 3:
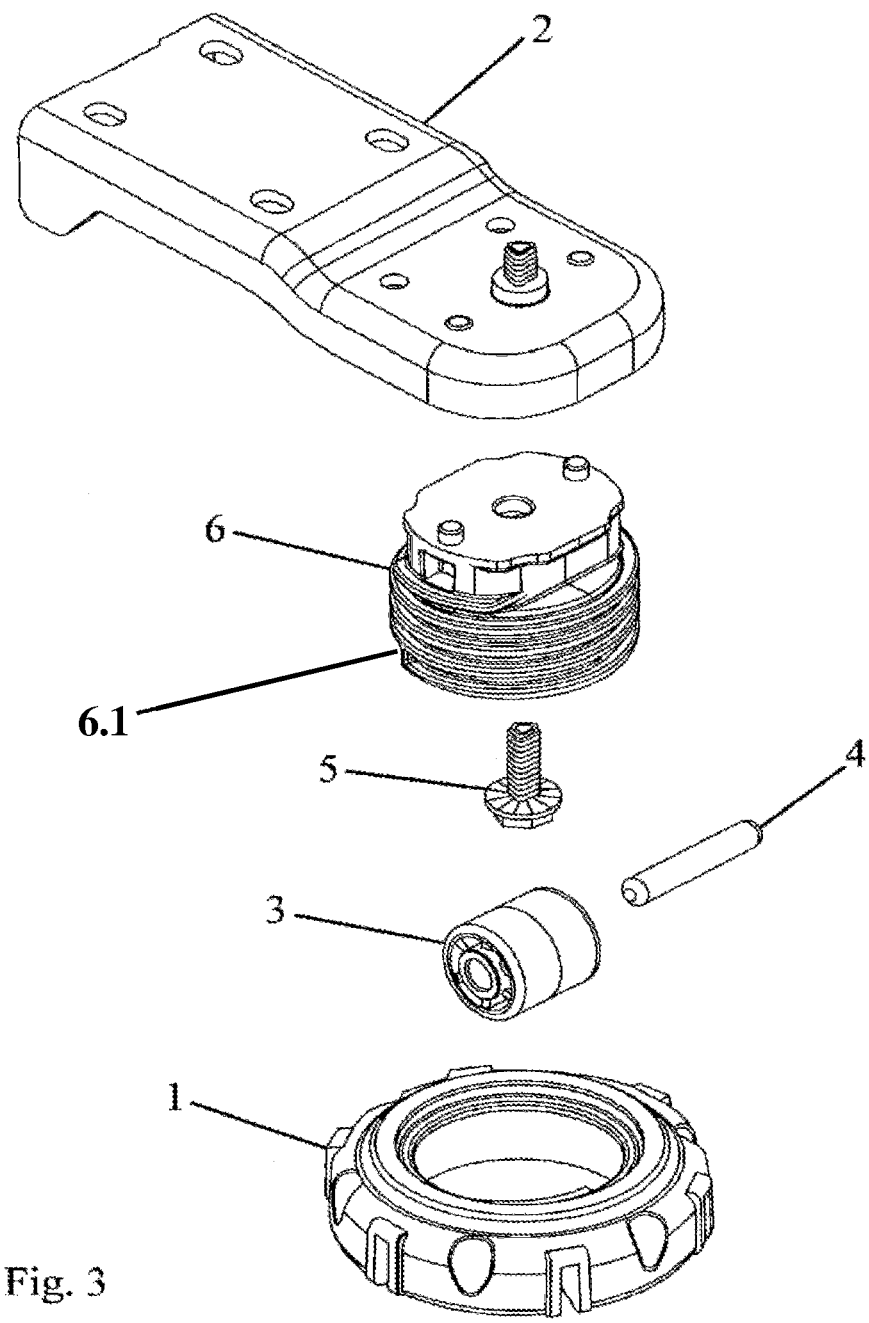
FIG. 3 illustrates an exploded view of the leveling foot set evidencing its components part: the external ring (1), the base (2), the castor (3), the axle (4) of castor (3), the vertical axle (5) which is a screw in the presented setting, and the internal ring (6)
Figure 4:
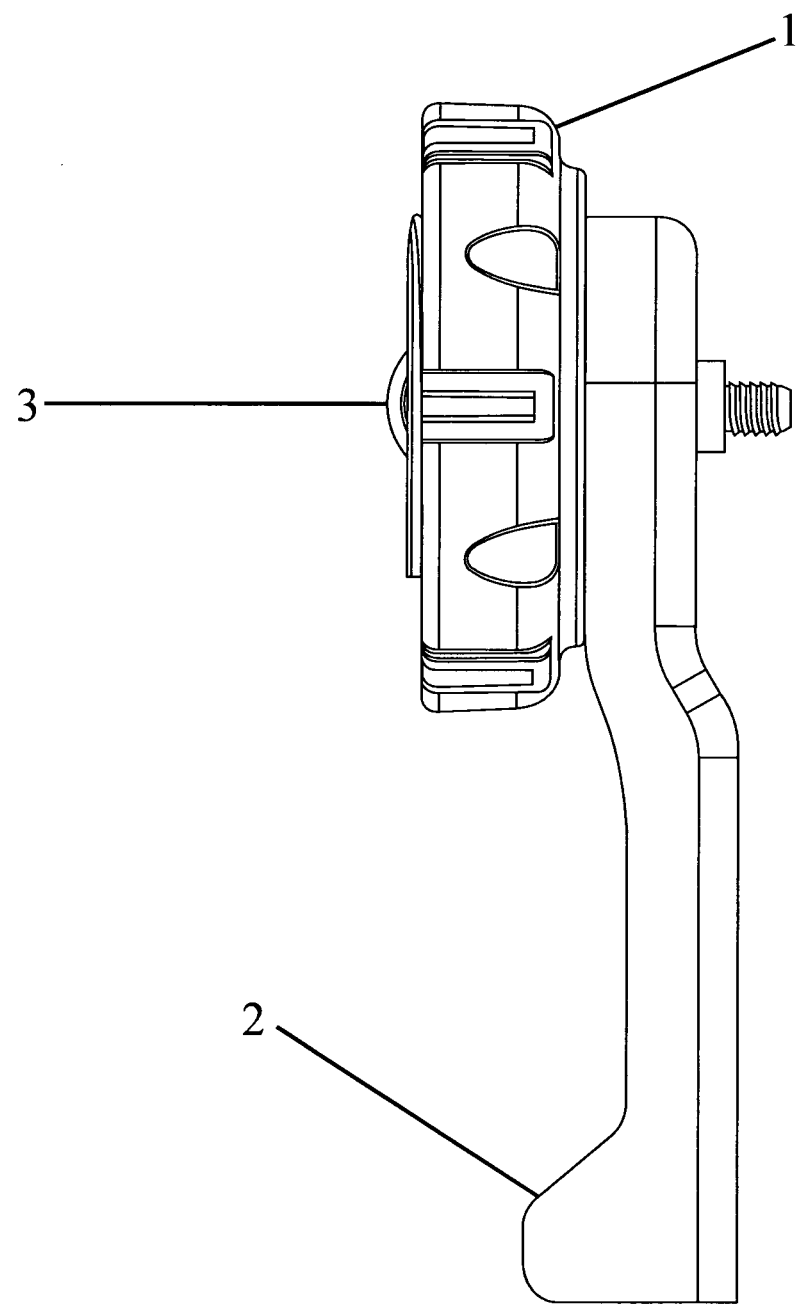
FIG. 4 illustrates a side view of the leveling foot set evidencing the external ring (1), the base (2) and castor (3).

This invention comprises a leveling feet with embedded castors (3) for use in household appliances. The intent is to provide household appliance leveling with respect to a supporting surface. This is performed upon by the separate adjustment of each leveling foot height in order to compensate for eventual irregularity and variations of the surface where the household appliance is placed.

A leveling foot allows adjustment of the height by the interaction between the external ring (1) and external threads of the internal ring (6), which is fastened to the device structure or in a base (2) and raises or lowers the equipment according to the user's need. In the internal ring (6), there is a rebound (6.1) positioned at a lower end of the external threads of the internal ring (6), which does not allow the total removal of the external ring (1). This prevents the involuntary disassembly of the set. In other words, the rebound (6.1) positioned at the lower end of the external threads of the internal ring (6) interrupts the external threads and creates an obstacle to the passage of the external ring (1). In one example, the set comprises a metallic base (2), which may be a plastic or another material, supporting the leveling foot. Alternatively, the leveling foot may comprise the external ring (1), internal ring (6), and a castor (3) fastened directly to the equipment, that is, without using the fastening base (2).

The internal ring (6) has a tubular format and contains grooves in the external surface that makes a thread for the interaction with the external ring (1) and has an interior a support for the castor (3).

In one modality, the leveling foot fits the base (2) in a specific format hole and is positioned in the hole by another small rebound (not shown) located in the base and fastened by the vertical axle (5), which is a screw in this setting.

an axle in which the ends of projections are fitted and positioned internally in the internal ring (6), therefore characterizing the embedded castor (3).

Alternatively, the castor (3) could be fastened in the auxiliary part, included in the internal ring (6), and rotated by the vertical axle (5), so that the castor (3) could rotate (in addition to rotating in its own axle) together with the auxiliary part, around the vertical axle (5), and allowing the equipment movement in any direction during the displacement.

The set also has an external ring (1) moving vertically on the external part of the thread of the tubular part, delimiting the height where the base (2) is smooth leveling of a household appliance in view of a small the ratio step/diameter.

The base (2) has a substantially rectangular format, but may have any of other of a plurality of forms, and the other rebound located in the front part of the base. The center position of said other rebound located in the front part of the base comprises a hole receiving the vertical axis (5), which is a screw in said setting, to fasten the internal ring (6). The setting allows the insertion of the castor (3) in the internal ring (6), if inserted in the specific supports. The inserted castor remains embedded during use of the leveling foot.

The invention is not limited to the representations herein commented or illustrated and should be understood in its full scope. Several modifications and other invention representations would come to mind of such skilled in the arts to which this invention belongs, with the benefit of the teaching presented in the previous descriptions and the attached drawings. Moreover, it should be understood the invention is not limited to the specific disclosure and the modifications and other ways are understood as included in the scope of the attached claims. To the extent that, specific words are used herein, they are used only generically for descriptively other than and limiting purposes.

The invention claimed is:

1. A leveling foot for a household appliance, comprising:
   a castor configured to contact and roll on a surface;
   a substantially tubular internal ring comprising external threads provided thereon and a rebound configured to interrupt the external threads at a lower end of the external threads, the castor being positioned inside the internal ring; and
   an external ring positioned around and coupled to the internal ring, the external ring comprising internal threads configured to mate with the external threads of the internal ring, the rebound of the internal ring being configured to inhibit and create an obstacle to removal of the external ring from the lower end of the external threads of the internal ring, the external ring being configured to move on the internal ring when rotated about the internal ring such that rotation of the external ring after the external ring contacts the surface lifts the castor from the surface, fastens and adjusts a height of the household appliance, and compensates for irregularities in the surface.

2. The leveling foot of claim 1, wherein the height of the household appliance is adjustable as a function of dimensions of the external threads on the internal ring and the internal threads on the external ring.

3. The leveling foot of claim 1, further comprising a base coupled to the internal ring, with the base coupling the internal ring to the household appliance.

4. The leveling foot of claim 1, wherein the castor is fastened to the internal ring by a horizontal axis, with the castor being movable about the horizontal axis.

5. The leveling foot of claim 1, wherein the leveling foot comprises a plurality of leveling feet that are each coupled to the household appliance via a base member in order to level corners of the household appliance relative to a surface.

6. The leveling foot of claim 1, wherein the internal threads of the external ring are configured to interact with the external threads of the internal ring to enable the external ring to be rotatable about the internal ring.

7. The leveling foot of claim 1, wherein the castor is positioned within an inner circumference of the external ring.

* * * * *

UNITED STATES PATENT AND TRADEMARK OFFICE
CERTIFICATE OF CORRECTION

PATENT NO. : 9,200,745 B2
APPLICATION NO. : 13/376475
DATED : December 1, 2015
INVENTOR(S) : Gustavo Gnoatto Amaral et al.

Page 1 of 1

It is certified that error appears in the above-identified patent and that said Letters Patent is hereby corrected as shown below:

In the specification,

Column 1, line 49, please replace "platform set to" with -- platform to --

Column 2, line 59, please replace the heading "DETAILED DESCRIPTION OF THE SOLUTION" with -- DETAILED DESCRIPTION --

Column 2, line 64, please replace "performed upon by" with -- performed by --

Column 3, lines 20-21, please replace "interior a support" with -- interior support --

Column 3, line 26, please replace "an axle in which the ends of" with
-- The associated castor (3) contains an axle in which the ends of intended --

Column 3, lines 38-39, please replace "(2) is smooth leveling of a household appliance in view of a small the ratio" with -- (2) is supported, and therefore enabling the smooth leveling of a household appliance in view of a small ratio --

Signed and Sealed this
Twelfth Day of April, 2016

Michelle K. Lee
*Director of the United States Patent and Trademark Office*